United States Patent Office 2,918,575
Patented Dec. 22, 1959

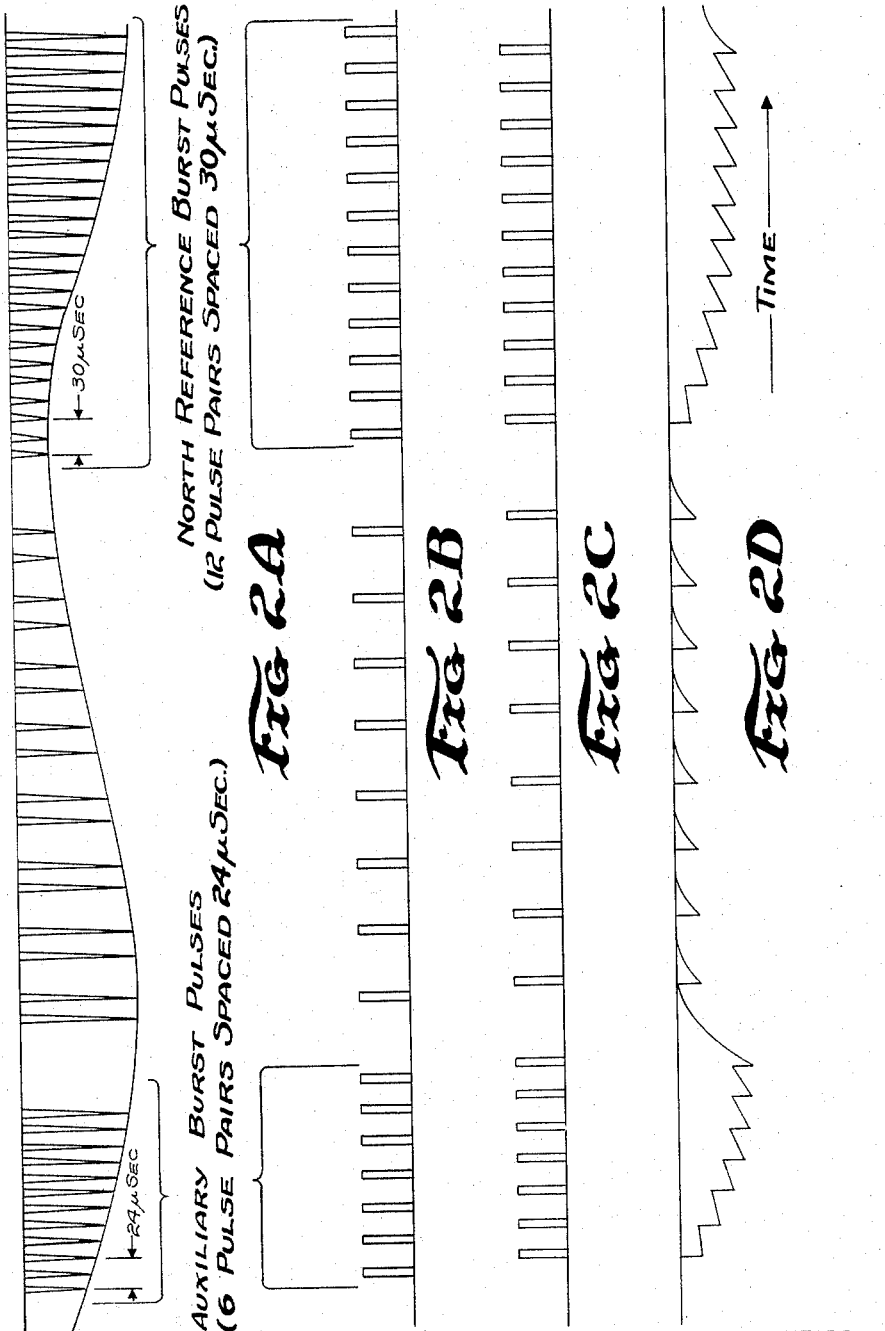

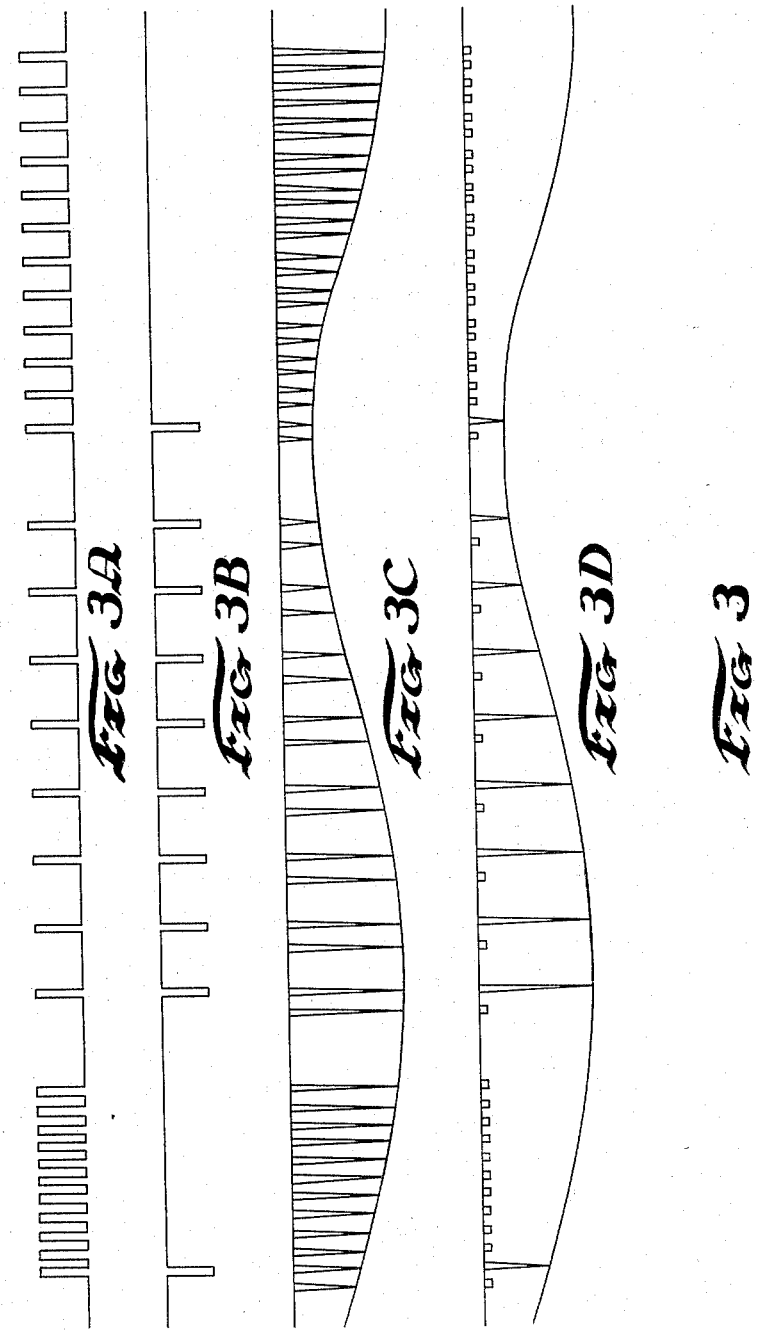

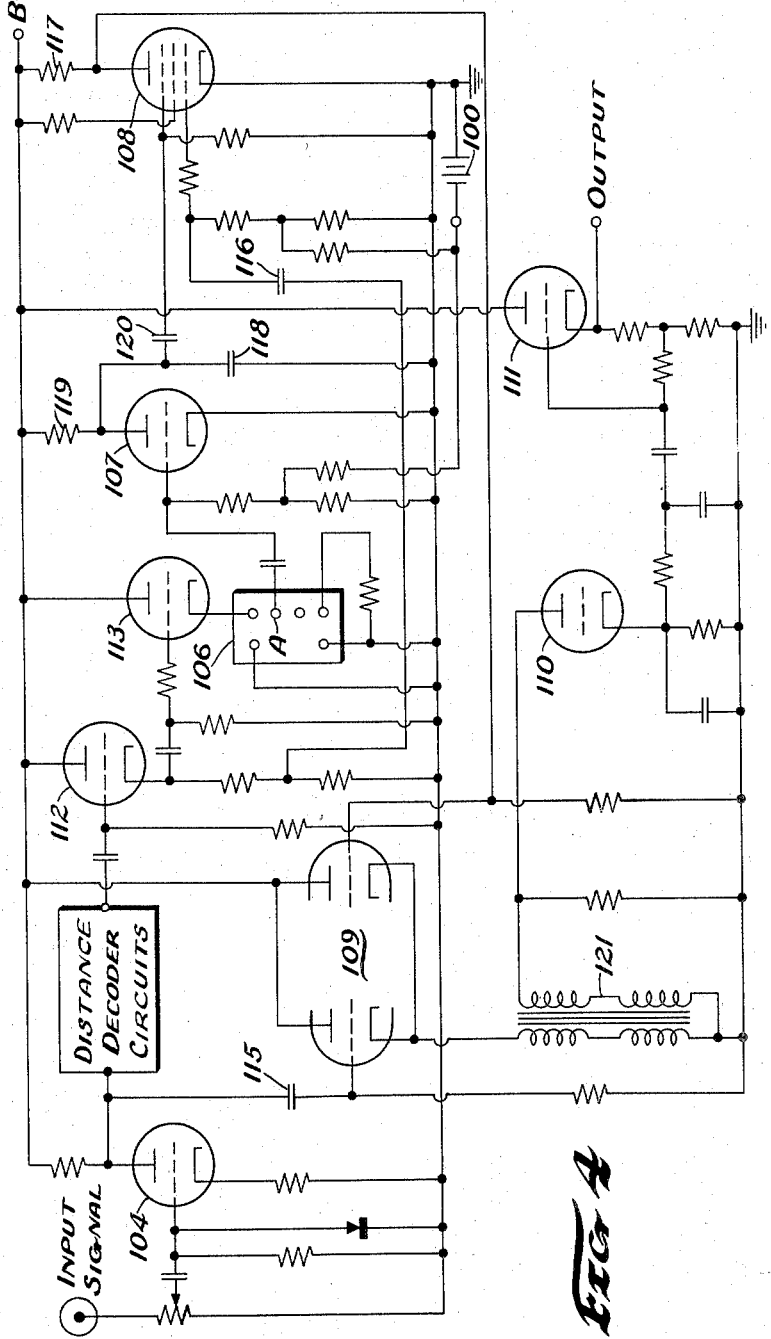

2,918,575
BURST ELIMINATOR CIRCUITRY

Kenneth W. Porter, Jr., Cedar Rapids, and Harry F. Stillwell, Marion, Iowa, assignors to Collins Radio Company, Cedar Rapids, Iowa, a corporation of Iowa Application June 6, 1956, Serial No. 589,795

3 Claims. (Cl. 250—27)

This invention relates to detecting systems and more particularly to detecting systems where burst pulses must be eliminated to provide sensitivity of the detector to peak voltage only.

A new navigation system has recently been developed which provides bearing determination through the use of a rotating antenna pattern to produce amplitude modulation on the transmitted signal. This modultaion is compared with reference signals to determine the bearing of the aircraft. The bursts which are the reference signals provide a problem of distortion in the azimuth variable signal. This distortion contributes to cyclic error in the azimuth readings. Detector systems do not normally reject average voltages and accept only the peak voltage. It can readily be seen that these bursts generate a greater average voltage than usual and therefore an error is introduced into the detector system if this average voltage is utilized. This invention provides a system for eliminating these burst pulses from the detector scheme and thereby eliminates the average voltage and prevents cyclic errors from occurring.

It is a feature of this invention that burst pulses are effectively eliminated from the detector, thereby increasing the sensitivity of the detector and of the associated navigation system. The advantage of using positive burst pulses for the reference signals is maintained while the disadvantage of the increased average energy transmitted is overcome. It is a further feature of this invention that the burst eliminator circuit provides for the removal of the energy from the burst pulses with the exception of the energy due to the first pulse.

It is an object of this invention to provide a navigation system where positive burst pulses are used as reference signals and where these burst pulses are substantially eliminated from the envelope detector to provide increased accuracy in the navigation system.

It is another object of this invention to provide a burst elimination circuit which allows the first pulse of a group of burst pulses to be passed and detected while eliminating the average energy due to the voltage value of the remaining burst of pulses.

These and other objects of this invention will become apparent when the following description is read in conjunction with the accompanying drawings, in which Figure 1 is a block diagram of the burst eliminator circuit including the decoder circuit of the navigation system;

Figures 2 and 3 are representations of the configuration of the pulses at various points in the navigation system;

Figure 4 is a detailed schematic of a portion of the block diagram of Figure 1.

Figure 1:
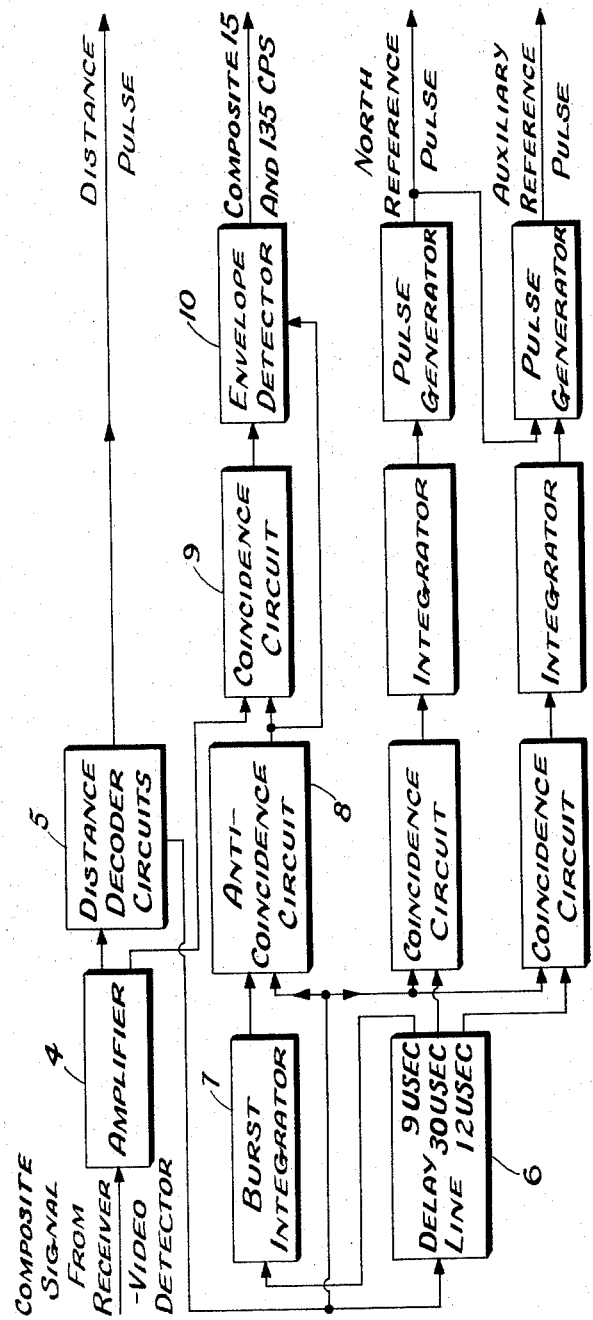

Referring now to Figure 1, the composite signal from the receiver video detector is applied to the amplifier-detector 4. This composite signal has the configuration of the signal shown in Figure 2A. Figure 2A shows the sector burst pulses and the north reference burst pulse as they are included in the envelope of modulation. The composite signal is partially decoded by the distance decoder circuits which are not a part of this invention. The distance decoder circuits generate a signal having the configuration of the signal shown in Figure 2B and this signal from the distance decoder circuits is applied to the delay line 6. The delay line 6 actually has a plurality of varied delays for use with the north and auxiliary burst intelligence signals and the composite burst signals; however, this invention is concerned with only one of these delays.

The delay applied to the signal from decoder circuit 5 by delay line 6 is approximately nine microseconds. The output signal from the delay line 6 has the same configuration as the input signal to delay line 6 and is applied with the burst pulses expanded to the burst integrator 7. The burst integrator integrates this input pulse having a configuration shown in Figure 2C and produces an output signal having the configuration of the signal shown in Figure 2D. This output signal from the burst integrator is applied to an anti-coincidence or burst eliminator 8 in combination with the signal from the distance decoder; the signal from the distance decoder has the configuration of the signal shown in Figure 3A. The input signals to the burst eliminator thus include the decoded information with the burst pulses expanded. The output signal generated by the anti-coincidence circuit 8 is applied to the coincidence circuit 9 and the output signal from the anti-coincidence circuit has the configuration of the signal shown in Figure 3B. Additionally, a signal which is the composite signal from the receiver video detector and which signal has the configuration of the signal shown in Figure 3C is also applied to the coincidence circuit 9. This latter signal is obtained from the output of amplifier 4. The output signal from the coincidence detector 9 has the burst pulses removed. The output signal from the coincidence detector has the configuration of the signal shown in Figure 3D. This output signal is applied to an envelope detector 10 with a signal from the anti-coincidence detector 8. The output signal from the envelope 10 is a composite signal composed of the two modulation frequencies. This composite signal is then filtered and phase-compared so as to give an accurate bearing indication.

Referring now to Figure 4, the input signal, the information signal from the intermediate frequency detector, is applied to amplifier 104 and the signal from the amplifier tube 104 is applied to one-half of the linear coincidence tube 109. The linear coincidence circuit consists of tube 109 and its associated circuitry. Tube 109 may be considered two cathode followers which are tied together. When signals are present on neither grid of tube 109, both tube sections conduct. The signal from the amplifier tube 104 is coupled to the grid of the first half of tube 109 by capacitance 115. The signal coupled to this grid has the configuration of the signal shown in Figure 3C. At the same time the distance decoded signal has been applied to the pulse generator tube 112 and the cathode follower 113. The cathode follower 113 is used to furnish a low-impedance driving source for the delay line 106. The signal from the cathode follower is fed to the distance circuits of this navigation system and is also fed to the delay line 106 for use in the decoding of the composite signals of this invention. This signal is coupled to the control grid of the burst eliminator or anti-coincidence tube 108 by the cathode and the resistors. This burst eliminator tube 108 is biased beyond cut-off because the control grid is resistively connected to the negative voltage source 100. At the same time the distance decoded signal was coupled to the control grid of tube 108, it was impressed on the delay line 106 by the cathode follower 113. Nine microseconds later this signal appears at the tap A of the delay line 106. This signal is coupled to the control grid of the burst eliminator circuit tube 107. It is noted that this burst eliminator tube is also biased beyond cut-off because the control grid is resistively connected to the negative voltage source 100.

It is apparent from the above description that the first pulse of the burst of pulses contained in the distance decoded signal derived at the control grid of tube 108 might coincide with itself before it arrives at the burst integrator tube 107. This first pulse of the burst of possible pulses from the range decoder system will cause tube 108 to conduct. This develops a negative pulse across the plate load resistor 117. This negative pulse is coupled to the control grid of the second half of the linear coincidence tube of tube 109. Nine microseconds later, it is remembered that the positive pulses arise at the control grid of tube 107.

This first pulse of the burst which has been delayed nine microseconds causes tube 107 to conduct. When tube 107 conducts, the capacitance 118 connected between the plate of tube 107 and ground discharges to the lowered plate potential. Now when the positive pulse disappears from control grid, tube 107 will again be biased to cut-off and capacitance 118 will begin to charge exponentially as determined by the time constant of capacitance 118 and plate resistance 119. When a burst of pulses whose spacing between pulses is less than fifty microseconds is applied to the burst integrator 107, the capacitance 118 cannot re-charge between successive pulses. In this event, the pulses of the burst applied to tube 107 are integrated and a negative pulse with a sawtooth edge the width of the burst is generated to the burst of the plate of tube 107.

This negative pulse which is the integrated burst pulse is coupled to the suppressor grid of tube 108 by capacitance 120. This negative integrated burst pulse on the suppressor grid prevents burst eliminator tube 108 from conducting after the first pulse of the burst. Thus the burst has been eliminated with the exception of the single pulse which is the first pulse of the burst. This first pulse is connected as described above to the linear coincidence tube 109.

In the linear coincidence tube 109 there is usually carried an input signal which is the amplified original composite signal. When this signal is applied to the grid of the first half of tube 109 with no signal present on the second grid, conduction in the first half of the tube 109 is reduced. This decreases the bias on the second half of the tube and results in increasing conduction of the second half of the linear coincidence tube 109. This increased conduction in the second half of tube 109 compensates for the decreased conduction in the first half due to the application of the negative signal. Thus, in the absence of a signal on the control grid of the second half of tube 109, the signal on the control grid of the first half of tube 109 has negligible effect on the total current.

Thus, at this time, twelve microseconds later, which is the delay necessary to the decoding process described above, including the nine microsecond delay in the delay line, pulses from the burst eliminator tube 108 are applied to the second control grid of tube 109. Bursts have been effectively eliminated as described above and may be disregarded. Now the second pulse applied to the second grid of tube 109 no longer maintains the tube 109 with a total grid current substantially identical to that with no signal applied to either grid. With the negative pulse applied to the second grid and a negative pulse applied to the first grid simultaneously, the first half of tube 109 acts as an independent cathode follower and linearly reproduces on its cathode the input to its grid. This signal is delayed approximately six microseconds and is then applied to the envelope detector tube 110 through transformer 121. The envelope detector tube 110 and the cathode follower tube 111 act to generate the amplitude modulated 15- and 135-cycle signals which are necessary reference signals.

Although this invention has been described with respect to a particular embodiment thereof, it is not to be so limited, as changes and modifications may be made therein which are within the full intended scope of the invention, as defined by the appended claims.

What is claimed is:

1. A burst eliminator circuit for demodulating the envelope of an amplitude-modulated pulsed signal having bursts of closely-spaced pulses, comprising a delay line for delaying said pulsed signal a predetermined length of time greater than the duration of one pulse, means for integrating said pulsed signal to produce an integrated output signal having a duration corresponding to said bursts, an anticoincidence circuit having a first input and an inhibiting input, means connecting the inhibiting input to said integrated output signal, and the first input receiving said pulsed signal, a coincidence circuit having a pair of inputs and an output, with one input receiving said pulsed signal, and an output of said anticoincidence circuit connected to the other input of said coincidence circuit, and amplitude-detection means connected to the output of said coincidence circuit to provide the envelope demodulation without distortion by said bursts.

2. A burst eliminator circuit including an input signal, said input signal being a pulsed amplitude-modulated signal wherein some of the pulses are bursts of closely spaced pulses, means for receiving said input signal, a delay line for delaying said pulsed information signals a predetermined length of time, said delay line connected to said receiving means and providing a delayed output, means for integrating said delayed signal over periods of its pulse bursts, anticoincidence means having a plurality of input terminals, one input terminal connected to said receiving means and another input terminal connected to the delayed ouput of said integrating means, said another input being an inhibiting input for rendering said anticoincidence circuit inoperative in response to the output sgnal of said integrating means, a coincidence circuit having first and second input terminals and an output, with its first input terminal connected to said receiving means to receive said input signal, and the second input terminal connected to the output of said anticoincidence circuit, the output signal of said coincidence circuit having the amplitude modulation of the input signal and with at least one pulse of each burst of pulses remaining.

3. A burst eliminator circuit including an input signal, said input signal being amplitude-modulated pulse pairs wherein some of the pairs of pulses are closely spaced to form bursts, means for decoding said pulse pairs to provide one pulse per pair timed with the second pulse in each pair, a delay line for delaying said decoded pulses for a length of time greater than the duration of one of said decoded pulses, said delay line connected to said decoding means, means for integrating said delayed decoded pulses to prouce an integrated output signal for the duration of each burst, an anticoincidence circuit having first and second inputs, with the first input connected to the output of said decoding means, the second input connected to said integrating means to receive the integrated signal, said anticoincidence circuit rendered nonconducting by the output signal of said integrating means, a coincidence circuit having a pair of inputs and an output, with one input receiving said pulse pairs, and with the other input connected to the output of said anticoincidence circuit, a pulsed output signal of said coincidence circuit having the amplitude modulation of the input signal and with all but one pulse of each burst of pulses removed from said signal.

References Cited in the file of this patent

UNITED STATES PATENTS

| | | |
|---|---|---|
| 2,408,079 | Labin et al. | Sept. 24, 1946 |
| 2,493,648 | Watton et al. | Jan. 3, 1950 |
| 2,545,464 | Hoeppner | Mar. 20, 1951 |
| 2,560,600 | Schafer | July 17, 1951 |
| 2,592,308 | Meacham | Apr. 8, 1952 |
| 2,738,463 | Metzger | Mar. 13, 1956 |
| 2,777,059 | Stites | Jan. 8, 1957 |
| 2,789,267 | Beal et al. | Apr. 16, 1957 |